United States Patent [19]

Wenzel

[11] 4,110,878

[45] Sep. 5, 1978

[54] METHOD FOR MANUFACTURING AN IMPREGNATED WOUND FOIL CAPACITOR

[76] Inventor: Kurt Wenzel, Larchenweg 6, A2751 Matzendorf, Austria

[21] Appl. No.: 728,028

[22] Filed: Sep. 30, 1976

[51] Int. Cl.² .............................................. H01G 4/22
[52] U.S. Cl. .................................. 29/25.42; 361/314; 427/81
[58] Field of Search ............... 29/25.42; 361/314, 313, 361/315; 427/81

[56] References Cited

U.S. PATENT DOCUMENTS

| 3,026,457 | 3/1962 | Ruscito | 361/315 |
| 3,049,651 | 8/1962 | Adelson | 361/313 |
| 3,648,339 | 3/1972 | Preissinger | 361/314 X |

FOREIGN PATENT DOCUMENTS

| 120,808 | 7/1971 | Denmark | 361/314 |
| 2,427,202 | 1/1975 | Fed. Rep. of Germany | 361/314 |
| 2,403,125 | 7/1975 | Fed. Rep. of Germany | 361/314 |

*Primary Examiner*—E. A. Goldberg
*Attorney, Agent, or Firm*—Haseltine, Lake & Waters

[57] ABSTRACT

A method for fabricating a wound type foil capacitor including the steps of forming a wound capacitor from two electrodes and a dielectric, the dielectric including at least one synthetic plastic foil, and heating the wound capacitor to a temperature corresponding to the shrinking temperature of at least one stretched foil. The stretched foil is adjacent to another foil, and the latter is at least shrunk to a lesser extent than the first foil within a shrinking range including that lesser extent up to a completely extended state. The wound capacitor is additionally maintained at the temperature corresponding to the shrinking temperature of the stretched foil until folds develop in the other foil, and then impregnated with an impregnating fluid.

3 Claims, 7 Drawing Figures

METHOD FOR MANUFACTURING AN IMPREGNATED WOUND FOIL CAPACITOR

FIELD OF THE INVENTION

The invention relates to a method for the manufacture of a wound type foil capacitor, formed from two electrodes and a dielectric material comprising at least one foil made of synthetic material, the wound capacitor being subsequently impregnated.

BACKGROUND OF THE INVENTION

Capacitors having a dielectric material made exclusively of synthetic resin are generally superior to those capacitors, which employ in addition to synthetic foils also paper layers between the electrodes, or which have a dielectric material consisting exclusively of paper. Field strengths of up to 100–120 V/$\mu$ are obtained in well impregnated capacitors before glow discharge sets in using foils exclusively at a usual strength of the dielectric material between 2 and 20 $\mu$ versus field strengths between 55 to 75 V/$\mu$ using a mixed foil construction, and 30 to 40 V/$\mu$ of field strength using exclusively paper foils as the dielectric material. The corresponding insulation breakdowns amount to 400 V/$\mu$, 300 V/$\mu$ and 150 V/$\mu$ respectively. The clear-cut superiority of the employment of synthetic resin films in the construction of a dielectric appears to be primarily due to the fact that they contain gas or conductive particles to only small measure, along which currents may form at high voltages. It is in any case certain, that the operating field strength in capacitors employing foils exclusively can be increased in comparison to paper capacitors to an extent, that one half of the volume can easily be saved. The avoidance of any intermediate paper layers, does not, however, solely relate to savings in volume and material, but it provides the additional advantage, that the necessary air evacuation from the capacitor roller is not unduly extended by the necessary to reudce the hight moisture content of the paper.

In spite of the known advantages of the capacitors employing exclusively foils, the latter have not in fact been used in practice up to now. This is due to the fact that an impregnation of a wound capacitor consisting merely of synthetic foil and starting at a foil width of approximately 10 cm is only possible without using an intermediate paper layer acting as a wick, if one ensures that adjoining foils, or foils and electrodes are in limited surface contact. In this sense several pre-treatments of the synthetic foil or metal electrodes have been proposed, such as roughening, stamping or embossing, partial shrinking and the like. These methods are not only costly, but there is constantly the risk that the deformation of the extremely thin foils could produce tears or irregularities in the latter, which would negate the desired success.

SUMMARY OF THE INVENTION

The present invention avoids the disadvantages of known methods, and permits the employment of smooth foils for fabricating the foil wound capacitor for electrodes and dielectrics in the usual manner. The microscopic interspaces between the individual foils required for impregnation are only obtained upon the foils having already been processed into a wound capacitor and being protected thereby. This is obtained, according to the invention, by the wound capacitor being heated to a temperature prior to the impregnation thereof which is at least equal to the shrinking temperature of at least one stretched foil, which adjoins at least one foil which is not shrunk, or not shrunk to the same extent at that temperature, and by the wound capacitor being maintained at that temperature, until the non-shrunk or less strongly shrunk foils being to fold, or become undulating.

It is possible for the foils being adjacent to the shrinking foil to maintain their lengths upon being heated to a predetermined temperature and thereby develop folds, by these folds either not consisting of synthetic plastic material, which generally applies for the electrodes, or by the foils of synthetic plastic material not being stretched in advance. If stretched foils are used, which should develop folds, then care must be taken that their shrinking temperature is either not reached upon the provided heating or that they are less stretched than the adjoining foils required to shrink considerably.

The number and magnitude of the folds to be developed of the foils which are either required not to shrink, or to shrink to a lesser extent, can be influenced by the extendability of the roller being predetermined in a direction at right angles to the plane of the foil during the shrinking process. The best results are obtained if the wound capacitor is pressed together before its partial shrinking to the extent of 97% compressibility such that it will still be compressible by about a further 3 percent, and that it will be held compressed during the shrinking process. The waves which result are nearer together and have a correspondigly smaller height, the smaller is the extendability of the wound capacitor at right angles to the plane of foil during the shrinking process. Considerably shrinking foils, which may be used for the method, according to the invention, may, for example, be fabricated from the following materials, the shrinking temperature being stated within parentheses:

Polyethylene (100° C.)
Styroflex (100° C.)
Polypropylene (115° C.)
Polycarbonate (140° C.)
Polyester (150° C.)
Polysulfone (180° C.)

By the choice of the foil materials it is further possible to equalize the temperature coefficient of the dielectric constants, if a foil having a negative temperature coefficient is used with a foil having a positive temperature coefficient. It is therefore possible to a large extent to construct capacitors having a constant capacity.

The task is particularly well solved by polypropylene foils, combined with at least one polycarbonate foil. The polycarbonate foil has, in fact, a shrinking temperature at least 20° C. higher than a polypropylene foil, and has furthermore a temperature coefficient equalizing the capacity with respect to polypropylene.

BRIEF DESCRIPTION OF THE DRAWINGS

Details of the method, according to the invention, are illustrated in the drawing in which.

DESCRIPTION OF THE PREFERRED EMBODIMENTS

Figure 1:
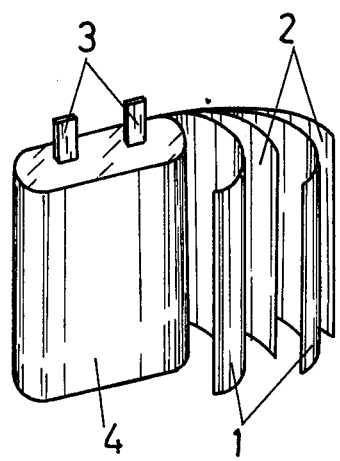
FIG. 1 shows a perspective view of a foil wound capacitor, according to the invention.

The method, according to the invention, does not differ initially from the usual method of manufacture of wound type capacitors, which is indeed one of its advantages. In order to manufacture the wound capacitor 4 illustrated in FIG. 1 of two aluminium foils serving as electrodes 1 and of the associated synthetic pastic-foils 2, one requires only conventional roller devices, which wind the still completely smooth foils. The wound capacitor 4 is provided in the usual manner with contacts 3. The flat wound capacitors manufactured in this fashion are then mounted in a known manner in packages over one another, as is shown clearly schematically in FIG. 2, whereby the necessary electrical connections are also made. The wound capacitors 4 are maintained under a predetermined pressure by a frame 6. Where it is desired in the conventional method to compress the pile of wound capacitor 4 as much as possible, in the method according to the invention the foils in the individual wound capacitor are enabled, to a certain extent, to stretch at individual locations at right angles to the plane of the foil. In order to obtain the correct degree of compression, it is recommended to initially compress the pile of rollers as much as possible, and subsequently to adjust the frame 6 to the extent that a pile expands by about 3%. The pile of rollers 4 fabricated in this way is subsequently inserted into a housing 5 in a known manner, which is formed with an opening closed only following impregnation.

Subsequently, air from the capacitors is evacuated up to a final vacuum of $10^{-3}$ to $10^{-2}$ atmospheres. Although the method of the invention could also be used for capacitors having paper layers, the present method, nevertheless, has the advantage that the package 4 is only fabricated of synthetic plastic material and metal, since the time required for air evacuation is thereby strongly reduced.

The inventive step of heating the capacitors to a temperature exceeding the shrinking temperature of at least one of the stretched foils contained in the wound capacitor 4 is accomplished during air evacuation. Following the shrinking process, the capacitors are cooled to the prescribed impregnation temperature, according to the steam-pressure temperature-curve in accordance with the impregnating fluid employed, for example, with trichlordiphenyl to 70° to 80° C., with polybutene to 100° C., and with a mineral oil to 80° C. Followng cooling to the impregnating temperature, the well prepared impregnation means are allowed to flow into an impregnating basin in the usual manner under vacuum, and the capacitors are impregnated. Following impregnation the capacitors are heated to 90° to 150° C., following closure of the vacuum pumps, and heated 2 to 20 hours depending on the magnitude of the capacitor units. Following cooling the capacitors are removed from the impregnating basin, refilled, and the impregnation opening of the container 5 is soldered shut.

Figure 3:
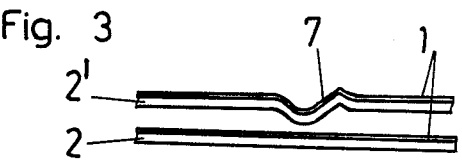
FIGS. 3 to 7 show schematically five examples of different foil combinations, according to the present invention.

Within the framework of the invention, layer sequences of widely varying categories can be selected during construction of a wound capacitor 4. It is particularly unnecessary, as shown in FIG. 3, to form the electrodes 1 as separate foils; they may rather be produced by metallizing of the synthetic plastic material serving as a dielectric. FIG. 3 shows schematically the state of the wound capacitor following shrinking of the plastic synthetic foil 2, which has led to the foil 2' having folds extending at right angles to its longitudinal extension, the folds 7 appearing generally over the whole width of the foil. These folds, or the appropriate recesses between the folds, permit the penetration of the impregnating fluid up to the center region of wound capacitors having a width of up a 600 mm. It is particularly advantageous if the non-shrinking foils 2' do not overlap, i.e., if the folds 7 are not Z-shaped, which could lead to a damage of the foils.

Figure 2:
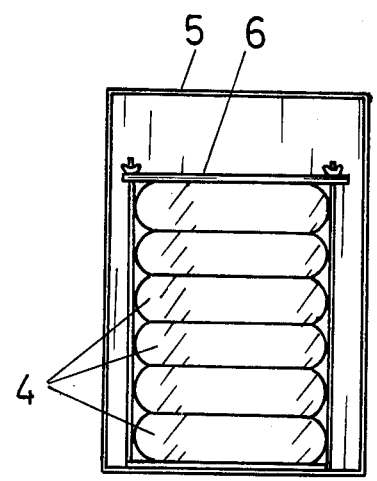
FIG. 2 shows the arrangement of a plurality of foil wound capacitors in a housing.
Figure 4:
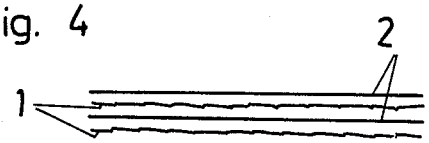
Figure 6:
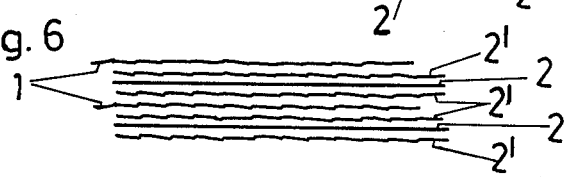
Figure 7:
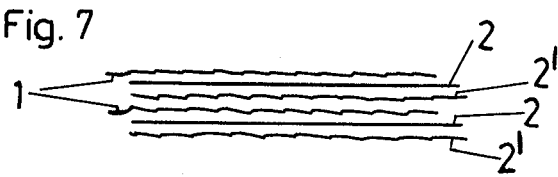

The wound capacitor according to FIG. 4 corresponds to the illustration of FIG. 1. It consists of synthetic plastic foils 2 tempered following winding, the aluminum foils serving as electrodes 1 developing folds as the result of the shrinking of the former. Not only do electrodes 1 remain unshrunk in the embodiments according to FIGS. 5 to 7, but shrunk folds 2, and unshrunk folded foils 2' alternate with one another in the interposed dielectric material. The difference between the three-last named embodiments consists in the fact that shrunk and unshrunk foils constantly alternate with one another, according to FIG. 5, which permits the penetration of the impregnating fluid in an optimum manner. The behavior of the synthetic plastic foils 2' being adjacent to electrodes 1 in the implementation examples shown in FIG. 6 is, however, largely similar to that of the electrodes 1 themselves. This has the advantage that the electrodes 1 are mechanically stressed to only a very small degree. On the other hand, the insertion of impregnating fluid between adjacent foils is primarily difficult where several synthetic foil layers abut one another, whereas the impregnating fluid can be mor easily inserted between a metal- and a synthetic-plastic material. The embodiment according to FIG. 7 is primarily selected if the total required thickness of the dielectric material is small.

Figure 5:
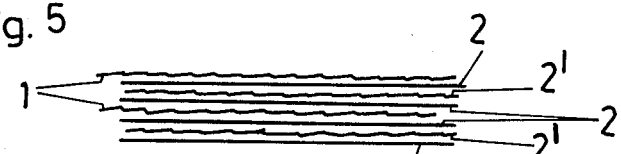

If the method, according to the invention is used for the manufacture of power capacitors impregnated with trichlordiphenyl, then two $12\mu$ thick polypropylene foils can be used, for example, according to the implementation according to FIG. 5, which embrace a $6\mu$ thick polycarbonate foil. In the latter case, the capacitor is suitable for an application of a voltage of 1500 V and 50 Hz alternating frequency. A capacitor according to FIG. 7, having a $6\mu$ thick polypropylene or polycarbonate foil corresponds to an operating voltage of 600 Volts at 50 Hz frequency. It is, of course, possible to use any other appropriate fluid suitable as impregnation means for this purpose.

What is claimed is:

1. A method for the manufacture of a wound type foil capacitor comprising the steps of: forming a wound capacitor from two electrodes and a dielectric, the dielectric including at least two synthetic plastic foils, at least one of which is pre-stretched;

heating the wound capacitor to a temperature corresponding to the shrinking temperature of said at least one stretched foil, said at least one stretched foil being adjacent to the other foil, said other foil being at least shrunk to a lesser extent than said one foil within a shrinking range including said lesser extent up to a completely extended state; maintaining said wound capacitor at said temperature corresponding to the shrinking temperature of said at least one stretched foil until folds develop in said other foil;

compressing said wound capacitor up to 97% compressibility:

maintaining the compressed state of said wound capacitor during the shrinking process, and thereafter impregnating said wound capacitor with an impregnating fluid.

2. The method according to claim 1 further comprising the steps of:

employing foils of different respective materials for fabricating said wound capacitor; and exceeding said temperature corresponding to the shrinking temperature of said at least one stretched foil for only some of said foils on different respective materials prior to the impregnating step.

3. The method according to claim 1 further comprising the step of heating the wound capacitor to a temperature exceeding the shrinking temperature of said at least one stretched foil.

* * * * *

UNITED STATES PATENT AND TRADEMARK OFFICE
CERTIFICATE OF CORRECTION

PATENT NO. : 4,110,878
DATED : September 5, 1978
INVENTOR(S) : WENZEL

It is certified that error appears in the above-identified patent and that said Letters Patent are hereby corrected as shown below:

After line 5, please insert:

-- Claims priority, Application Austria - June 15, 1976 4379/76 --.

Signed and Sealed this

Twenty-fourth Day of April 1979

[SEAL]

Attest:

RUTH C. MASON
Attesting Officer

DONALD W. BANNER
Commissioner of Patents and Trademarks